United States Patent
Berger et al.

(10) Patent No.: US 9,556,358 B2
(45) Date of Patent: Jan. 31, 2017

(54) COATED METALLIC ARTICLE

(71) Applicants: Jan Berger, Dortmund (DE); Klaus Gahlmann, Marl (DE); Harald Haeger, Luedinghausen (DE); Markus Hartmann, Sendenhorst (DE); Jasmin Nitsche, Dortmund (DE)

(72) Inventors: Jan Berger, Dortmund (DE); Klaus Gahlmann, Marl (DE); Harald Haeger, Luedinghausen (DE); Markus Hartmann, Sendenhorst (DE); Jasmin Nitsche, Dortmund (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/872,226

(22) Filed: Apr. 29, 2013

(65) Prior Publication Data

US 2013/0287981 A1 Oct. 31, 2013

(30) Foreign Application Priority Data

Apr. 30, 2012 (DE) .................. 10 2012 207 173

(51) Int. Cl.
| | |
|---|---|
| *C09D 177/06* | (2006.01) |
| *C09D 5/08* | (2006.01) |
| *C09D 177/02* | (2006.01) |
| *F16L 58/10* | (2006.01) |
| *C08G 61/08* | (2006.01) |

(52) U.S. Cl.
CPC ............. *C09D 177/06* (2013.01); *C09D 5/08* (2013.01); *C09D 177/02* (2013.01); *F16L 58/109* (2013.01); *C08G 61/08* (2013.01); *C08G 2261/135* (2013.01); *C08G 2261/3322* (2013.01); *C08G 2261/418* (2013.01); *C08G 2261/58* (2013.01); *C08G 2261/76* (2013.01); *Y10T 428/1355* (2015.01); *Y10T 428/3154* (2015.04); *Y10T 428/31529* (2015.04); *Y10T 428/31605* (2015.04); *Y10T 428/31681* (2015.04); *Y10T 428/31692* (2015.04); *Y10T 428/31699* (2015.04)

(58) Field of Classification Search
CPC ....... C09D 175/04; C09D 5/08; C09D 177/06; F16L 58/109; F16L 9/147; F16L 58/1045; Y10T 428/1355; Y10T 428/31529; Y10T 428/3154; Y10T 428/31605; Y10T 428/31681; Y10T 428/31692; Y10T 428/31699; C08G 2261/135; C08G 2261/3322; C08G 2261/418; C08G 2261/58; C08G 2261/76; C08G 61/08

USPC ..... 427/142; 428/35.8, 425.8, 458, 461, 463
See application file for complete search history.

(56) References Cited

U.S. PATENT DOCUMENTS

| | | | |
|---|---|---|---|
| 5,520,223 A | 5/1996 | Iorio et al. | |
| 5,565,051 A * | 10/1996 | Marzola ............. | F16L 58/1063 138/99 |
| 5,686,535 A | 11/1997 | Erickson et al. | |
| 6,915,820 B2 | 7/2005 | Picco et al. | |
| 6,977,289 B2 | 12/2005 | Detig-Karlou et al. | |
| 8,017,691 B2 | 9/2011 | Richter et al. | |
| 2001/0023537 A1 | 9/2001 | Gahlmann et al. | |
| 2004/0143084 A1 | 7/2004 | Detig-Karlou et al. | |
| 2004/0198862 A1 | 10/2004 | Moens et al. | |
| 2010/0300572 A1* | 12/2010 | Dowe et al. ................. | 138/140 |
| 2011/0014443 A1 | 1/2011 | Yokoi et al. | |
| 2011/0200818 A1 | 8/2011 | Djunaidi et al. | |
| 2012/0000541 A1 | 1/2012 | Dowe et al. | |
| 2012/0257932 A1 | 10/2012 | Hartmann et al. | |
| 2013/0153134 A1 | 6/2013 | Djunaidi et al. | |

FOREIGN PATENT DOCUMENTS

| | | |
|---|---|---|
| CN | 1533419 A | 9/2004 |
| EP | 1 130 066 A1 | 9/2001 |
| WO | WO 03/102095 A1 | 12/2003 |
| WO | WO 2004/046217 A1 | 6/2004 |
| WO | WO 2009/027429 A2 | 3/2009 |
| WO | WO 2010/094528 A1 | 8/2010 |

OTHER PUBLICATIONS

European Search Report issued Aug. 22, 2013, in European Patent Application No. 13163753.0.

* cited by examiner

*Primary Examiner* — Yan Lan
(74) *Attorney, Agent, or Firm* — Oblon, McClelland, Maier & Neustadt, L.L.P.

(57) ABSTRACT

A method for coating of a metallic article is provided. According to the method, the metal surface is coated with a composition which comprises a polymer or comprises a two-component system that reacts to form a polymer following application to the metal surface. The composition comprises 70-2700 meq/kg olefinic double bonds which leads to stronger adhesion and to increased corrosion resistance.

7 Claims, No Drawings

COATED METALLIC ARTICLE

CROSS REFERENCE TO RELATED APPLICATIONS

This application claims priority to German Application No. 102012207173.3, filed Apr. 30, 2012, the disclosure of which are incorporated herein by reference in its entirety.

BACKGROUND OF THE INVENTION

The invention relates to a method for the coating of a metallic article with a polymer composition which comprises multiply unsaturated compounds, and also to the coated metallic articles themselves and to their use. The coated metallic articles may be, for example, metal pipes clad with the polymer composition.

Metallic articles intended for applications in which they are exposed to corrosion-promoting environmental influences may be coated with a protective layer of polymer materials, this layer being applied to the metallic article in the form of a melt, by means of extrusion coating, for instance. This not only blocks access to the metal surface for the corrosion-promoting agent, but also provides the surface with some mechanical protection with respect, for example, to stresses such as friction, impact or jolt. This protection is desirable even when the surface has also undergone corrosion control treatment prior to coating. A vital prerequisite for such protection is that the applied coating adheres strongly, so that in the event of mechanical damage, the corrosion-promoting agent—for example, water or aqueous salt solution—does not migrate beneath the coating.

If the metallic article is composed, for example, of aluminium, an aluminium alloy, zinc or galvanized steel, it has conventionally been pretreated by chromating. This generates a passivating coat which has the effect of improving not only the corrosion resistance but also the adhesion of a subsequently applied polymer composition. In the wake of new statutory guidelines such as the EU End of Life Vehicles Directive and the RoHS Directive, chromation with carcinogenic chromium(VI)-containing compounds is in many sectors no longer permissible, however. This has given rise to a great interest in chromium(VI)-free alternatives. Examples of such alternatives are chromium(III)-passivations, but these are weaker by comparison, or the use of passivating baths which comprise titanium(IV)-salts and/or zirconium(VI)-salts, such as complex fluorides, for example, with which a passivating coat of titanium oxide or zirconium oxide, respectively, is formed. In passivating baths of these kinds it is also possible for the use of other metal salts, such as cobalt salts or cerium salts, for example, to play a part. As requirements become more acute, the passivating coat obtained may serve as an adhesion base for coating with a thermoplastic or thermoset polymer system, thereby further improving the corrosion control.

Another possibility for corrosion control is phosphating. Phosphating is a widespread technique within surface technology, in which a layer of strongly adhering metal phosphates is formed by chemical reaction of metallic surfaces with aqueous phosphate solutions and/or aqueous phosphoric acid. Phosphating is mostly employed with steel, but can also be used for galvanized or cadmium-plated steels and aluminium. Phosphate layers alone offer a useful temporary protection from corrosion, which is often sufficient for storage prior to a subsequent processing step. In the art, phosphate layers are used very frequently as a base for further, subsequent coatings.

In all of these cases, the strong adhesion of the subsequent coatings to the passivating coat or phosphate layer is of considerable importance. This strong adhesion is vital for effective prevention of oxygen and electrolyte penetration that those locations where mechanical damage occurs to the coating, as a result of stonechipping, for example, in order that filiform corrosion does not occur. Filiform corrosion is a type of corrosion which occurs for example on steel or aluminium beneath organic coats. It is characterized by threadlike subfilm migration. It is normally caused by a defect site or scratch in the coat. Strong adhesion between coating and metal must also be ensured so that further processing steps such as crimping or bending are not accompanied by any delamination of the coating, which would likewise result in subsequent filiform corrosion.

EP 1 130 066 A1 discloses an extrusion-coated metal profile for which an organosilane composition serves as an adhesion base for a coat which is applied by extrusion and consists of a polyamide moulding compound.

WO 2009/027429 discloses the use of a metallic line pipe whose surface is clad with a polyamide coat, for producing a pipeline which is laid trenchlessly or without a sand bed.

WO 2010/094528 discloses the use of a metallic line pipe which is clad with an extruded coat of a polyamide moulding compound for producing a pipeline which is laid in water.

U.S. Pat. No. 5,520,223 describes a zinc-plated metal pipe whose surface, following a pretreatment, is coated with a moulding compound based on thermoplastic elastomers, ionomers, polyamides and/or fluoropolymers.

In the described conventionally known systems, the coating material makes only a passive contribution to corrosion control, by hindering the ingressive water, including salt water, and atmospheric oxygen. Diffusion of atmospheric oxygen through the coating, however, continues to be possible.

In view of the above described problems, the object of the present invention was to provide a polymer composition for the coating of metallic articles that exhibits enhanced adhesion both to untreated and to treated metal surfaces and at the same time makes an active contribution to corrosion control.

SUMMARY OF THE INVENTION

This and other objects have been achieved by the present invention, the first embodiment of which includes a method for coating a metallic article, comprising: applying a composition to the metal surface to obtain a coated surface; wherein the composition comprises: a) a polymer; or a two-component system which reacts to form a polymer following application to the metal surface; and the composition comprises 70-2700 meq/kg olefinic double bonds.

In one aspect of the first embodiment, the polymer or the two component system which reacts to form the polymer comprises the 70-2700 meq/kg olefinic double bonds, while in a second aspect of the first embodiment, the composition further comprises an amount of an unsaturated compound which comprises an olefinic double bonds such that the composition comprises 70-2700 meq/kg olefinic double bonds. According to this second aspect, the number average molecular weight ($M_n$) of the unsaturated compound is not more than 38,000 g/mol as determined by vapour pressure osmometry.

In a second embodiment the present invention includes a metallic article which comprises a coating wherein the coating is obtained by application of a composition to a metallic surface of the article and the composition comprises: a) a polymer; or a two-component system which reacts to form a polymer following application to the metal surface; and the composition comprises 70-2700 meq/kg olefinic double bonds.

In further embodiments, the present invention provides corrosion protected parts, lines and construction components.

DETAILED DESCRIPTION OF THE INVENTION

In the first embodiment, the present invention provides a method for producing a coated metallic article by coating the metal surface with a composition which comprises a polymer or comprises a two-component system that reacts to form a polymer following application to the metal surface, the composition comprising 70-2700 meq/kg, preferably 140-1800 meq/kg and more preferably 350-1350 meq/kg olefinic double bonds.

The invention further provides a coated metallic article produced by coating the metal surface with a composition which comprises a polymer or comprises a two-component system that reacts to form a polymer following application to the metal surface, the composition comprising 70-2700 meq/kg, preferably 140-1800 meq/kg and more preferably 350-1350 meq/kg olefinic double bonds.

In one embodiment the polymer or the two-component system comprises ethylenically unsaturated monomer units which originate, for example, from unsaturated dicarboxylic acids such as dodeca-2,10-diene-1,12-dicarboxylic acid; the polymer may be, for example, a polyamide or a polyurethane (WO 2009/144089 A1 and WO 2009/144094 A1).

In a further embodiment, the invention provides a method for producing a coated metallic article, which comprises:
coating a metal surface with a composition which comprises the following components:
a) a polymer, or a two-component system which reacts to form a polymer following application to the metal surface, and also
b) an unsaturated compound which comprises olefinic double bonds, possesses a number-average molecular weight $M_n$, determined by vapour pressure osmometry, of not more than 38 000 g/mol and preferably of not more than 34 000 g/mol, and is present in an amount such that the composition comprises 70-2700 meq/kg, preferably 140-1800 meq/kg and more preferably 350-1350 meq/kg, of olefinic double bonds.

In another further embodiment, the invention additionally provides a coated metallic article produced by coating the metal surface with a composition which comprises:
a) a polymer, or a two-component system which reacts to form a polymer following application to the metal surface, and also
b) an unsaturated compound which comprises olefinic double bonds, possesses a number-average molecular weight $M_n$, determined by vapour pressure osmometry, of not more than 38 000 g/mol and preferably of not more than 34 000 g/mol, and is present in an amount such that the composition comprises 70-2700 meq/kg, preferably 140-1800 meq/kg and more preferably 350-1350 meq/kg, of these double bonds.

The metallic article for coating with the composition according to the present invention may be any metal. Examples thereof are steel, stainless steel, copper, aluminium, cast iron, brass, zinc, alloys with one of these metals as principal constituent, galvanized steel, cadmium plated steel, aluminium-coated metal, or steel coated with metal alloys such as GALFAN, for example. Preference may be given to coating metallic articles whose surface is steel, zinc or an alloy having as a principal constituent, aluminium, iron or zinc.

The surface of the metal article to be coated may be subjected to pretreatment for corrosion control—for example, to one of the abovementioned passivation or phosphating techniques. Similarly, the use of polymers having a complexing action and selected from the group consisting of polyacrylates, copolymers of α-olefins and acrylates, polyethers, and mixtures of these polymers, may constitute an effective support in corrosion control. It may also be possible, however, to coat a metallic article having an untreated surface. The surface may optionally also be pretreated by blasting, such as by sandblasting, for example.

Although it is preferred, in the context of the method of the invention, to forgo chromating that produces chromium (VI)-containing chromate layers, it may also be possible, in a further embodiment, for a chromated metal surface to be coated with the composition according to the present invention. Furthermore, prior to treatment with the composition according to the present invention, the metal surface may also be pretreated in any other conventionally known way, such as that described in U.S. Pat. No. 5,520,223, for example.

To achieve strong adhesion there may be no need, apart from the optional pretreatment described in the previous paragraphs, to use an additional adhesion promoter. Preferably, therefore, no additional adhesion promoter is applied to the optionally pretreated metal surface. It is nevertheless within the scope of the invention, for an adhesion promoter to be applied additionally, such as an epoxy resin or a functionalized polyolefin, for example, if performance advantages may be achieved.

The metallic article to be treated may have any desired form. It may be, for example, a panel, a sheet, a housing or a profile such as a pipe, for instance.

The polymer of the composition according to the claim may in principle be any polymer suitable for such a coating. Examples are polyamides, polyolefins, thermoplastic polyurethanes, polyvinyl chloride, and fluoropolymers. In some embodiments of the present invention, polyamides may be preferred.

The two-component system which reacts to form a polymer following application to the metal surface may be a resin/curing agent combination. According to this embodiment, the polymer may be a polyurethane or epoxy resin.

The polyamide which can be used in accordance with the invention may be obtained from a combination of diamine and dicarboxylic acid, from an o-aminocarboxylic acid or from the corresponding lactam. In principle it may be possible to use any polyamide, for example PA46, PA6, PA66 or copolyamides on this basis with units deriving from terephthalic acid and/or isophthalic acid (identified generally as PPA). In one preferred embodiment the monomer units contain on average at least 8, at least 9 or at least 10 C atoms. In the case of mixtures of lactams, it is the arithmetic mean that is considered here. In the case of a combination of diamine and dicarboxylic acid, the arithmetic mean of the C atoms of diamine and dicarboxylic acid in this preferred embodiment must be at least 8, at least 9 or at least 10. Examples of suitable polyamides include: PA610 (obtained from hexamethylenediamine [6 C atoms] and sebacic acid [10 C atoms], so the mean of the C atoms in the monomer units here is 8), PA88 (obtained from octamethylenediamine and 1.8-octanedioic acid), PA8 (obtained from capryllactam), PA612, PA810, PA108, PA9, PA613, PA614, PA812, PA128, PA1010, PA10, PA814, PA148, PA1012, PA11, PA1014, PA1212 and PA12. The preparation of the polyamides is conventionally known. It will be appreciated that copolyamides based thereon may also be used, in which case it may be possible, optionally, for monomers such as caprolactam to be used as well.

The polyamide may also be a polyetheresteramide or a polyetheramide. Polyetheramides are described in DE-A 30 06 961, for example. They include a polyetherdiamine as comonomer. Suitable polyetherdiamines are obtainable by conversion of the corresponding polyetherdiols by reductive amination or coupling to acrylonitrile with subsequent hydrogenation (e.g. EP-A-0 434 244; EP-A-0 296 852). They generally possess a number-average molar mass of 230 to 4000; the polyetheramide fraction therein may preferably be 5 to 50 wt. %.

Commercially available polyetherdiamines starting from propylene glycol are available commercially as JEFFAMIN® D products from Huntsman. Also suitable are polyetherdiamines starting from 1,4-butanediol or 1,3-butanediol, or polyetherdiamines of mixed construction, for instance with random or blockwise distribution of the units originating from the diols.

Mixtures of different polyamides may be used according to the present invention, provided that compatibility is sufficient. Compatible polyamide combinations are known, and include the combinations PA12/PA1012, PA12/PA1212, PA612/PA12, PA613/PA12, PA1014/PA12 and PA610/PA12, and also corresponding combinations of PA11 Compatible combinations may be ascertained by routine tests.

In one possible embodiment a mixture of 30 to 99 wt. %, more preferably 40 to 98 wt. % and especially preferably 50 to 96 wt. % of polyamide, and 1 to 70 wt. %, more preferably 2 to 60 wt. % and especially preferably 4 to 50 wt. % of polyetheresteramide and/or polyetheramide may be used. Polyetheramides may be preferred in this embodiment.

The polyamide preferably has a molecular weight $M_n$ of greater than 5000, more particularly of greater than 8000. It may be preferred to use polyamides whose end groups are amino groups, since this may improve the adhesion. For example, at least 30%, at least 40%, at least 50%, at least 60%, at least 70%, at least 80% or at least 90% of the end groups may be amino end groups. The preparation of polyamides having a relatively high amino end group content, using diamines or polyamines as chain transfer agents, isconventionally known. In the present invention, when preparing the polyamide, it may be preferred to use an aliphatic, cycloaliphatic or araliphatic diamine having 4 to 44 C atoms as chain transfer agent. Examples of suitable diamines are hexamethylenediamine, decamethylenediamine, 2,2,4- and 2,4,4-trimethylhexamethylenediamine, dodecamethylenediamine, 1,4-diaminocyclohexane, 1,4- or 1,3-dimethylaminocyclohexane, 4,4'-diaminodicyclohexylmethane, 4,4'-diamino-3,3'-dimethyldicyclohexylmethane, 4,4'-diaminodicyclohexylpropane, isophoronediamine, metaxylylenediamine or paraxylylenediamine.

In a further preferred embodiment the polyamide may be prepared using a polyamine as chain transfer agent and branching agent at the same time. Examples of such agents include diethylenetriamine, 1,5-diamino-3-(β3-aminoethyl) pentane, tris(2-aminoethyl)amine, N,N-bis(2-aminoethyl)-N',N'-bis[2-[bis(2-aminoethyl)amino]ethyl]-1,2-ethanediamine, dendrimers and also polyethyleneimines, more particularly branched polyethyleneimines, which are obtainable by polymerization of aziridines (Houben-Weyl, Methoden der Organischen Chemie, volume E20, pages 1482-1487, Georg Thieme Verlag Stuttgart, 1987) and which in general possess the following amino group distribution:

25 to 46% primary amino groups,
30 to 45% secondary amino groups and
16 to 40% tertiary amino groups.

According to the present invention, adhesion to the metal surface may be improved still further if the composition, in addition to polyamide and unsaturated compound, further comprises compounds selected from:

Oxazolines such as, for example, 2-ethyl-2-oxazoline, 2-phenyl-2-oxazoline, 2-isopropenyl-2-oxazoline, 2-ethyl-4-methyl-2-oxazoline, 2-phenyl-4-ethyl-2-oxazoline, 2-phenyl-4-methyl-2-oxazoline. The oxazolines may be used alone or as a mixture. Based on the polyamide composition, 0.05 to 10 wt. % and preferably 0.1 to 5 wt. % may be used.

Bisoxazolines such as, for example, 2,2'-methylenebis(2-oxazoline), 2,2'-ethylenebis(2-oxazoline), 2,2'-ethylenebis(4-methyl-2-oxazoline), 2,2'-propylenebis(2-oxazoline), 2,2'-tetramethylenebis(2-oxazoline), 2,2'-hexamethylenebis(2-oxazoline), 2,2'-octamethylenebis(2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-m-phenylenebis(4-methyl-2-oxazoline), 2,2'-o-phenylenebis(4-methyl-2-oxazoline), 2,2'-p-phenylenebis(4-phenyl-2-oxazoline), 2,2'-m-phenylenebis(4-phenyl-2-oxazoline), 2,2'-o-phenylenebis(4-phenyl-2-oxazoline), 2,2'-bis(2-oxazoline), 2,2'-bis(4-methyl-2-oxazoline), 2,2'-bis(4-ethyl-2-oxazoline), 2,2'-bis(4-phenyl-2-oxazoline). These bisoxazolines may be used alone or as a mixture. Based on the polyamide composition, 0.05 to 10 wt. % and preferably 0.1 to 5 wt. % may be used.

Polyoxazolines, which can be prepared by cationic ring-opening polymerization of oxazolines, examples being the compounds stated above. Based on the polyamide composition, it may be possible for 0.05 to 10 wt. % and preferably 0.1 to 5 wt. % to be used.

Bifunctional epoxides such as, for example, bisphenol diglycidyl ethers or an epoxy resin having an epoxide functionality of at least 2. A multiplicity of such compounds is available commercially. Here again, based on the polyamide composition, 0.05 to 10 wt. % and preferably 0.1 to 5 wt. % may be used.

Adhesion resins based on acetophenone-formaldehyde resins or cyclohexanone-formaldehyde resins. A multiplicity of such compounds is available commercially. The amounts used, based on the polyamide composition, may be from 0.05 to 10 wt. % and preferably from 0.1 to 5 wt. %.

These additions may be particularly efficient in terms of improving adhesion when at least 50% of the end groups in the polyamide are present in the form of amino groups.

The polyolefin may be, for example, polyethylene or polypropylene. In principle it may be possible to use any commercially available polyethylene or polypropylene, including: linear polyethylene of high, medium or low density, LDPE, ethylene-acrylic ester copolymers, ethylene-vinyl acetate copolymers, isotactic or atactic homopolypropylene, random copolymers of propene with ethene and/or but-1-ene, ethylene-propylene block copolymers, and so on. The polyolefin may be prepared by any known method, as for example in accordance with Ziegler-Natta, by the Phillips process, by means of metallocenes, or free-radically.

The fluoropolymer may be a polyvinylidene fluoride (PVDF), an ethylene-tetrafluoroethylene copolymer (ETFE), an ETFE modified with a ter component such as, for example, propene, hexafluoropropene, vinyl fluoride or vinylidene fluoride (for example EFEP), an ethylene-chlorotrifluoroethylene copolymer (E-CTFE), a polychlorotrifluoroethylene (PCTFE), a tetrafluoroethylene-hexafluoropropene-vinylidene fluoride copolymer (THV), a tetrafluoroethylene-hexafluoropropene copolymer (FEP) or a tetrafluoroethylene-perfluoroalkyl vinyl ether copolymer (PFA).

Besides polymer, unsaturated compound and the aforementioned additions, the composition may comprise further components including impact modifiers, other thermoplastics, plasticizers, pigments, fibrous reinforcements, flame retardants, processing assistants and stabilizers.

The unsaturated compound used in accordance with the present invention comprises olefinic double bonds; the effect of these double bonds may be a dual one. On the one hand, they may improve the adhesion to metal surface; on the other hand, they are reactive towards corrosion-promoting compounds such as oxygen. As a result, oxygen entering by diffusion may be captured by the double bonds and hence no longer gets through to the interface of polymer with metal or anti-corrosion coat. It is advantageous according to the present invention if the double bonds are sufficiently nucleophilic. In one preferred embodiment they carry no substituents which produce a −M effect or a −I effect which outweighs any +M effect that may be present at the same time. Examples of such substituents include carboxylic ester groups, nitrile groups or chlorine.

There is an upper limit on the molecular weight of the unsaturated compound. The reason for this may be that the unsaturated compound must have a sufficient mobility so that a sufficient fraction of the double bonds may be available for attachment to the metal surface. In one embodiment of the invention the polymer is a polyamide, and not more than 80 wt. % of the unsaturated compound, preferably not more than 60 wt. % of the unsaturated compound, more preferably not more than 40 wt. % of the unsaturated compound, and with a special preference not more than 20 wt. % of the unsaturated compound carries a functional group which is capable of attachment to the polyamide. Examples of such functional groups include carboxylic anhydride, carboxylic acid, epoxide, oxazinone, isocyanate or carbodiimide groups. This measure additionally ensures sufficient mobility of the unsaturated compound. In one embodiment of the present invention the unsaturated compound contains no functional groups.

On the other hand, the mobility of the unsaturated compound must not be so high that the vapour pressure of the compound is such that it becomes volatile over the course of time. For this reason, the number-average molecular weight $M_n$ of the unsaturated compound may preferably be at least 200 g/mol, more preferably at least 300 g/mol and with particular preference at least 400 g/mol.

The number-average molecular weight may be determined by vapour pressure osmometry. This is done using the Vapor Pressure Osmometer K-7000 from Wissenschaftlicher Gerätebau Dr. Ing. Herbert Knauer GmbH, Berlin, Germany, and operating in accordance with the handbook available for this instrument, in the version of 03/2007. It will be appreciated that any other instrument may be used that measures according to the same technique and arrives at the same results.

According to the present invention, the following classes of substance may be used as an unsaturated compound:

polyalkenylenes;
esters of unsaturated carboxylic acids;
esters of unsaturated alcohols;
polymers having polymerized diene monomer units.

Polyalkenylenes are composed of repeating units of the formula

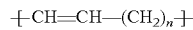

with n=3 to 10. They are usually prepared by ring-opening polymerization of cycloolefins in the presence of a metathesis catalyst. Examples of suitable polymers include polypentenylene, polyhexenylene, polyheptenylene, polyoctenylene, polynonenylene, polydecenylene, poly(3-methyloctenylene), poly(3-methyldecenylene), polyundecenylene or polydodecenylene. Polyalkenylenes are occasionally also referred to as polyalkenamers, and the associated polymers as polypentenamer, polyhexenamer, polyheptenamer, polyoctenamer etc.

The preparation of polypentenylene is described in U.S. Pat. No. 3,607,853, for example. Polyhexenylene is prepared by alternating copolymerization of butadiene and ethene. The preparation of polyheptenylene is accomplished by metathesis of cycloheptene (e.g. U.S. Pat. No. 4,334,048), and that of polyoctenylene by metathesis of cyclooctene (A. Dräxler, Kautschuk+Gummi, Kunststoff 1981, pages 185 to 190). The higher polyalkenylenes are prepared accordingly. For the purposes of the invention it may also be possible to use mixed polyalkenylenes, i.e. copolymers (U.S. Pat. Nos. 3,974,092; 3,974,094) or mixtures of different polyalkenylenes.

Esters of unsaturated carboxylic acids are those with a monohydric or polyhydric alcohol, examples being methyl esters, ethylene glycol monoesters or diesters, glycerol monoesters, diesters or triesters, and also corresponding esters of neopentyl glycol or sorbitol with oleic acid, linolenic acid, elaidic acid, undecylene acid, erucic acid, linoleic acid, arachidonic acid and the like. As esters of unsaturated carboxylic acids it may also be possible to use natural oils.

Esters of unsaturated alcohols may include monocarboxylic, oligocarboxylic or polycarboxylic acids components; and as unsaturated alcohol allyl alcohol, crotyl alcohol, oleyl alcohol and the like may be used. One example thereof is the partial or full transesterification product which can be obtained from polymethyl acrylate or polymethyl methacrylate and an unsaturated alcohol such as allyl alcohol, crotyl alcohol, oleyl alcohol or the like. Polyacrylates of these kinds may exhibit good compatibility, for example, with fluoropolymers among others.

Polymers whose monomer units include dienes are, for example, polybutadiene, polyisoprene (in both cases with cis-1,4, trans-1, 4 or 1,2 linkage or mixtures thereof), styrene-butadiene rubber, styrene-butadiene block copolymers such as SB or SBS or ethylene/$C_3$ to $C_{12}$ α-olefin/unconjugated diene terpolymers with 20 to 96, preferably 25 to 85 wt. % ethylene and up to a maximum of about 12 wt. % of an unconjugated diene such as bicyclo[2.2.1]heptadiene, hexa-1,4-diene, dicyclopentadiene or 5-ethylidenenorbornene. Examples of suitable $C_3$ to $C_{12}$ α-olefin include propene, 1-butene, 1-pentene, 1-hexene, 1-octene, 1-decene or 1-dodecene; examples thereof are ethylene-propylene-diene rubber (EPDM) and also ethylene-butylene-diene rubber. Nitrile rubber, and especially chloroprene rubber, are less suitable, since the double bonds are exposed to the −I effect of the nitrile groups and/or of the chlorine atoms, and their reactivity suffers from this. Such polymers ought to be employed in sufficiently low molecular weight form, as polybutadiene oil, for example, or at least with a number-average molecular weight $M_n$ of not more than 38 000 g/mol. If $M_n$ is above this limit, these polymers may nevertheless be used, but only in a mixture with a compound of sufficiently low molecular weight, such as polyoctenylene, polybutadiene oil or linseed oil, for example. Since the number-average molecular weight $M_n$ according to the claim represents the average value over all of the unsaturated compounds present in the composition, an excessively high $M_n$ can be brought beneath the limit according to the present invention by extension with a low molecular weight unsaturated compound.

Where polyamide is used as a component under a), it must additionally considered that the aforementioned rubbers may be incompatible with the polyamide. Commercially available EPDM, for example, generally has a number-average molecular weight $M_n$ which is well above the limit according to the present invention. This and the a polar character mean that polyamide and EPDM do not produce a stable mixture. The application of such a mixture to a metal surface may indeed result in an interaction between double bonds and the metal surface, insofar as EPDM domains come into contact with the metal; the composition, however, may undergo delamination at the slightest mechanical load, since there may be virtually no phase adhesion between EPDM and polyamide. In order to remedy this, polyamide EPDM blends are produced using, fundamentally, an EPDM which carries functional groups, carboxylic anhydride groups for example, that can be introduced by reaction with maleic anhydride or fumaric acid. This has the consequence that within such a blend the EPDM is dispersed in the polyamide matrix. In this case the EPDM domains are enveloped by polyamide. They are therefore no longer capable of interacting with the metal surface. The same applies, incidentally, to other rubbers as well, such as nitrile rubber, for example. In such cases the double bonds of the rubber may alone fulfil the oxygen-trapping function. In such cases, therefore, in accordance with the invention, a low molecular weight unsaturated compound may be added additionally but is sufficiently mobile and interacts with the metal surface.

Particular preference may be given to using a polyalkenylene, more particularly a polyoctenylene, as unsaturated compound. Suitable polyoctenylenes are available commercially under the trade name VESTENAMER®. In a development of this, a polyalkenylene, more particularly polyoctenylene, may be employed together with a rubber which is functionalized with carboxylic anhydride groups, for example EPM or EPDM, and which serves as an impact modifier, and also with polyamide as a component under a). EP 0 243 595 A2 describes that polyalkenylenes in polyamide moulding compounds give rise, with polymers that improve the impact strength, to synergistic effects in terms of the notched impact strength.

The composition used in accordance with the invention may be produced by mixing the components. If the component under a) is a polymer, mixing may take place in the melt.

The composition may be applied to the metal surface by any of conventionally known application techniques including extrusion, application of a tape with simultaneous heating, with the aid of hot air, for instance, or powder spraying methods or powder dipping methods or, in the case of resin/curing agent systems, by spraying, dipping, rolling or spreading. In the case of coating, the temperature of the metal surface is usually in the range from 10° C. to 300° C., depending on the coating method selected.

The method of extrusion coating is conventionally known. For details, reference may be made, for example, to F. Hensen, W. Knappe, H. Potente (eds.), Handbuch der Kunststoff-Extrusionstechnik, volume II, Hanser Verlag Munich Wien 1986, pages 321 to 353.

The extrusion rate may be adapted to the concentration of the double bonds present in the composition. Accordingly, compositions with a low double bond fraction allow only relatively low extrusion rates in order to achieve a high level of adhesion. Compositions with a high double bond fraction, in contrast, may allow higher extrusion rates. The double bond fraction of the composition may be adjusted by varying the nature and amount of the unsaturated compound.

On top of the coating of the composition according to the present invention, it may also be possible, as and when necessary, to apply one or more further polymer layers. This may be done by subsequent extrusion coating, and optionally an adhesion promoter may be applied additionally, or together with the layer according to the present invention, by coextrusion. Examples of suitable polymers include thermoplastic elastomers, ionomers comprising ethylene-methacrylic acid copolymers, fluoropolymers such as fluorinated rubber, for example, other rubbers, which may optionally comprise fillers, plasticizers and a vulcanizing system, or homopolymers or copolymers of ethylene. Suitable polymers are described in more detail in U.S. Pat. No. 5,520,223. With layers of these kinds it is possible to provide the pipe for instance with even better protection against mechanical exposures such as stonechipping, for example.

Outstanding and durable adhesion of the coating to the metal surface may be obtained according to the present invention. Moreover, improved corrosion control may be obtained. In a highly corrosive environment in particular, therefore, the coated metal component of the invention has a significantly extended lifetime.

A further advantage of the invention is that defects in an existing coating, such as at damaged sites or at weld seams, may be efficiently repaired. For this purpose, a corresponding composition can be applied by spraying, for example (a 2K [2-component] polyurethane system, for instance) or a patch or a tape can be applied with simultaneous heating, or a melt-applying method can be operated, with the aid of an extrusion welding apparatus, for instance. In this way it may be possible for damaged coating systems to be repaired even on building sites or on the high sea using materials of related kind.

In one embodiment, the invention may be used in motor vehicle construction or in mechanical engineering, and the coated metallic article is part of a motor vehicle or of a machine, for example a fuel line, a servo steering line, a cooling fluid line, a brake line or an air-conditioning unit line.

In a another embodiment, the coated metallic article may be a transport line, a distribution line, a mains connection line or a supply or disposal line. In that case it serves, for example, for the transport of heat in district heating systems, freshwater, wastewater, gas, air, oils such as, for example, crude oil, light oil or heavy oil, fuels such as kerosene or diesel, for example, petrochemicals, brines, alkalis, abrasive media, mining or injection materials or dusts.

In a further embodiment, the coated metallic article is a steel structural component for an offshore construction. Offshore constructions are fixed constructions which are erected in the open sea off from the shore. Examples of such offshore constructions are wind energy systems, drilling platforms and lighthouses. In this case the coated metallic article of the invention is preferably a steel construction pipe in the foundation structure of such offshore constructions. The foundation structure of offshore constructions is the region that supports the actual functional unit. In the case of wind energy systems, the foundation structure supports the tower, including turbine and rotors. In the case of drilling platforms, the foundation structure supports the platform, including superstructures. In the case of lighthouses, the foundation structure supports the tower, where present, and the lamp. The foundation structure is under water, in the intertidal zone, in the splash zone, and also, optionally, in the aerosol zone. The foundation structure includes the foundation elements which anchor it in the sea floor.

The foundation structure of an offshore wind energy system extends from the foundation elements which are anchored in the sea floor, via the structure which is located under water, to the point at which the tower begins and which may be located above the still water level.

Examples of types of foundation structure used include the following:

The monopile construction consists of a hollow cylindrical pile. The monopile is used in many European offshore wind parks which are near to the shore; it is suitable for foundations in water depths of up to around 20 meters. Monopiles can be installed easily and quickly; however, their erection requires heavy piling equipment. Attempts have more recently been made to carry out less aggressive installation with a drill head.

The jacket is a steel framework construction similar to the construction of conventional electricity pylons. At its four feet, the jacket is anchored in the sea floor with piles. The jacket construction is already established in the oil industry in relatively deep waters. Relative to the monopile, the framework construction can be used to make steel savings of 40 to 50%. Accordingly, the rise in project costs when using this construction in deeper waters is only relatively small. Since the individual construction elements are relatively small, they are easy to produce and can easily be transported and installed.

The structure of a tripod consists of three legs formed from steel pipes, and the central pipe is mounted centrally on the tripod. Each of the legs of the tripod may be seated on one pile or else on two or more piles. For pile driving, there are centring sleeves arranged at the corner points of the resultant equilateral triangle. The piles are joined to one another by horizontal struts and to the central pipe via diagonal stays. The central pipe is not bound in the sea floor. Since steel pipes with relatively small diameters are used here, the tripod can be employed for water depths of more than 20 meters.

The quadropod is a modification of the tripod concept, using four instead of three supports. This achieves increased foundation rigidity in deep waters.

The tripile consists of three steel columns which are anchored under water. A tripod construction is mounted onto these steel columns above water. According to manufacturer information, tripile foundations are suitable for water depths of 25 down to 50 meters.

Constructions of these kinds are described in the following publications:

Fundamente für Offshore-Windenergieanlagen [Foundations for offshore wind energy systems], Deutsche Energie-Agentur GmbH, issued December 2009;

Florian Biehl, Kollisionssicherheit von Offshore-Windenergieanlagen [Collision safety of offshore wind energy systems], Stahlbau, volume 78 (6), pp. 402-409 (2009);

K. Lesny, W. Richwien (editors), Grundung von Offshore-Windenergieanlagen-Werkzeuge für Planung und Bemessung [Foundations for offshore wind energy systems—tools for design and dimensioning], VGE Verlag Glückauf 2008, ISBN: 978-3-86797-035-8;

DE 103 10 708 A1.

For further details, reference may be made to the description of EP 2 511 430.

In another embodiment, the coated metallic article of the invention is a construction component of a ship or boat.

These embodiments are not limiting; the coated metallic article of the invention may of course also find other suitable uses as well.

Having generally described this invention, a further understanding can be obtained by reference to certain specific examples which are provided herein for purposes of illustration only, and are not intended to be limiting unless otherwise specified.

EXAMPLES

The materials used in the examples were as follows:

PA1: VESTAMID® L2101, a high-viscosity PA12 extrusion moulding compound with an excess of carboxyl end groups;

PA2: VESTAMID® ZA4487, an unregulated, low-viscosity PA12 with a balance ratio of carboxyl and amino end groups;

PA3: VESTAMID® ZA7295, a high-viscosity PA12 with an excess of amino end groups;

PA4: VESTAMID D18, a medium-viscosity PA612 with an excess of carboxyl end groups;

PA5: VESTAMID ZA7093, a medium-viscosity PA612 with an excess of amino end groups;

TOR 1: VESTENAMER® 6213, a polyoctenylene with a trans double bond fraction at about 60%;

TOR 2: VESTENAMER® 8012, a polyoctenylene with a trans double bond fraction at about 80%.

General Procedure for Preparing the Polymer Composition:

90 parts by weight of the polyamides PA1 to PA5 were melt-mixed at 260° C. with 10 parts by weight of TOR 1 in a WP ZSK 30, 33D twin-screw extruder, passed through a melt filtration system with a 25 mm screen package, and then extruded, cooled in a water bath, and pelletized.

In addition, polyamides PA3 and PA5 were melt-mixed with TOR 2 according to the same procedure.

Extrusion Coating of Aluminium Pipes:

The aluminium pipes were cleaned by the ALCOA method (reference: Walter Brockmann, Stefan Emrich, Kleben and Dichten volume 44, 9/2000, page 40), then wetted with a titanium salt solution (Granodine 1455 from Henkel, Germany), dried in a stream of air, heated inductively to a temperature of at least 240° C., and coated with the polyamide moulding compounds of Examples 1 to 7. For comparison, coatings with the polyamides PA1 to PA5 were also carried out accordingly (Comparative Examples 1 to 5).

A peel test was then used to examine whether the adhesion values were greater than 3 N/mm, since adhesion values of this kind must be achieved in order to prevent delamination of the polyamide coating during crimping of the pipe, for example. The moulding compounds of Examples 1 to 7 and the polyamides of Comparative Examples 2, 3 and 5 were found here to have adhesion values of greater than 3 N/mm. The adhesion values of the polyamides PA1 and PA4 were below 3 N/mm; these polyamides were therefore no longer investigated in the subsequent salt spray test.

In the salt spray test, the polyamide coating was damaged by a cut. The cut was made such that the unprotected aluminium surface was subsequently exposed to the environment. The cut area was then sprayed with a solution of sodium chloride in acetic acid.

After 500 hours and after 1000 hours, the adhesion and the filiform corrosion were ascertained. Polyamides PA2, PA3 and PA5 (Comparative Experiments 2, 3 and 5) failed after just 500 h in the salt spray test. The coatings of Examples 1 and 4 also failed after 1000 h (deficit of amino end groups). In the case of the coatings of Examples 2, 3, 5, 6 and 7, no loss of adhesion and no filiform corrosion could be observed even after 1000 h.

The results are set out in Table 1.

TABLE 1

Examples 1 to 7 (B1 to B7) and Comparative Experiments 1 to 5 (CB 1 to CB 5)

|  | B1 | B2 | B3 | B4 | B5 | B6 | B7 | CB1 | CB2 | CB3 | CB4 | CB5 |
|---|---|---|---|---|---|---|---|---|---|---|---|---|
| PA1 [parts by weight] | 90 |  |  |  |  |  |  | 100 |  |  |  |  |
| PA2 [parts by weight] |  | 90 |  |  |  |  |  |  | 100 |  |  |  |
| PA3 [parts by weight] |  |  | 90 |  | 90 |  |  |  |  | 100 |  |  |
| PA4 [parts by weight] |  |  |  | 90 |  |  |  |  |  |  | 100 |  |
| PA5 [parts by weight] |  |  |  |  |  | 90 | 90 |  |  |  |  | 100 |
| TOR 1 [parts by weight] | 10 | 10 | 10 | 10 | 10 |  |  |  |  |  |  |  |
| TOR 2 [parts by weight] |  |  |  |  |  | 10 | 10 |  |  |  |  |  |
| Adhesion value greater than 3 N/mm - passed | + | + | + | + | + | + | + | − | + | + | − | + |
| Salt spray test 500 h - passed | + | + | + | + | + | + | + | a) | − | − | a) | − |
| Salt spray test 1000 h - passed | − | + | + | − | + | + | + | a) | a) | a) | a) | a) | a) not tested

Numerous modifications and variations on the present invention are possible in light of the above description. It is therefore to be understood that within the scope of the appended claims, the invention may be practiced otherwise than as specifically described herein.

The invention claimed is:

1. A metallic article, comprising:
a surface; and
a coating applied to the surface,
wherein
the coating comprises at least one component having an olefinic double bond selected from the group consisting of:
a polyamide which comprises polymerized ethylenically unsaturated dicarboxylic monomer units, a polyurethane which comprises polymerized ethylenically unsaturated dicarboxylic monomer units, and
an unsaturated compound having a number average molecular weight ($M_n$) of 38,000 g/mol or less as determined by vapour pressure osmometry selected from the group consisting of a polyalkenylene, an ester of an unsaturated carboxylic acid, and an ester of an unsaturated alcohol, and
a content of olefinic double bonds in the coating is from 70-2700 meq/kg of the coating.

2. The metallic article according to claim 1,
wherein the at least one component having an olefinic double bond is the polyamide which comprises polymerized ethylenically unsaturated dicarboxylic monomer units and the polyamide comprises the 70-2700 meq/kg olefinic double bonds.

3. The metallic article according to claim 1,
wherein the at least one component having an olefinic double bond is the unsaturated compound which comprises olefinic double bonds, and
the unsaturated compound comprises the 70-2700 meq/kg olefinic double bonds.

4. The metallic article according to claim 1, wherein the at least one component having an olefinic double bond is the polyurethane which comprises polymerize ethylenically unsaturated dicarboxylic monomer units and the polyurethane comprises the 70-2700 meq/kg olefinic double bonds.

5. The metallic article according to claim 1 which is a corrosion protected part of a motor vehicle or of a machine.

6. The metallic article according to claim 1 which is a corrosion protected transport line, a corrosion protected distribution line, a corrosion protected mains connection line, a corrosion protected supply or a corrosion protected disposal line.

7. The metallic article according to claim 1, which is a corrosion protected steel construction component for an offshore construction, or a corrosion protected construction component of a ship or boat.

* * * * *